United States Patent
Dhong et al.

(10) Patent No.: US 7,406,589 B2
(45) Date of Patent: Jul. 29, 2008

(54) PROCESSOR HAVING EFFICIENT FUNCTION ESTIMATE INSTRUCTIONS

(75) Inventors: Sang Hoo Dhong, Austin, TX (US); Gordon Clyde Fossum, Austin, TX (US); Harm Peter Hofstee, Austin, TX (US); Brad William Michael, Cedar Park, TX (US); Silvia Melitta Mueller, Altdorf (DE); Hwa-Joon Oh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 11/127,848

(22) Filed: May 12, 2005

(65) Prior Publication Data

US 2006/0259745 A1    Nov. 16, 2006

(51) Int. Cl.
*G06F 7/552* (2006.01)
*G06F 7/544* (2006.01)
*G06F 7/38* (2006.01)

(52) U.S. Cl. .............. 712/222; 708/495; 708/508; 708/500; 708/502

(58) Field of Classification Search ............. 712/222; 708/495–514
See application file for complete search history.

(56) References Cited

U.S. PATENT DOCUMENTS

| | | | | |
|---|---|---|---|---|
| 5,046,038 A * | 9/1991 | Briggs et al. | ............ | 708/654 |
| 5,197,024 A * | 3/1993 | Pickett | ............ | 708/517 |
| 5,341,321 A * | 8/1994 | Karp et al. | ............ | 708/500 |
| 5,365,465 A * | 11/1994 | Larson | ............ | 708/204 |
| 5,475,630 A * | 12/1995 | Briggs et al. | ............ | 708/654 |
| 5,600,581 A * | 2/1997 | Dworkin et al. | ............ | 708/277 |
| 6,223,192 B1 * | 4/2001 | Oberman et al. | ............ | 708/270 |
| 6,256,653 B1 * | 7/2001 | Juffa et al. | ............ | 708/290 |
| 6,714,197 B1 * | 3/2004 | Thekkath et al. | ............ | 345/427 |
| 6,912,559 B1 * | 6/2005 | Ho et al. | ............ | 708/502 |
| 2004/0267854 A1 * | 12/2004 | Haider et al. | ............ | 708/512 |
| 2005/0071401 A1 * | 3/2005 | Clifton | ............ | 708/290 |

OTHER PUBLICATIONS

Bemer, R. W. 1958. A machine method for square-root computation. Commun. ACM 1, 1 (Jan. 1958), 6-7.*

* cited by examiner

*Primary Examiner*—Eddie P Chan
*Assistant Examiner*—William B Partridge
(74) *Attorney, Agent, or Firm*—VanLeeuwen & VanLeeuwen; D'Ann N. Rifai

(57) ABSTRACT

High-precision floating-point function estimates are split in two instructions each: a low precision table lookup instruction and a linear interpolation instruction. Estimates of different functions can be implemented using this scheme: A separate table-lookup instruction is provided for each different function, while only a single interpolation instruction is needed, since the single interpolation instruction can perform the interpolation step for any of the functions to be estimated. Thus, significantly less overhead is incurred than would be incurred with specialized hardware, while still maintaining a uniform FPU latency, which allows for much simpler control logic.

7 Claims, 4 Drawing Sheets

$$X = (-1)^S \times M \times 2^{(E-127)}$$

PROCESSOR HAVING EFFICIENT FUNCTION ESTIMATE INSTRUCTIONS

BACKGROUND OF THE INVENTION

1. Technical Field

The present invention is related generally to the architecture and instruction sets of processors, such as a microprocessor, microcontroller, or digital signal processor. More specifically, the present invention is directed to a processor having efficient instructions for estimating the values of certain floating-point functions.

2. Background Art

Many processor architectures, such as the PowerPC™ processor architecture, support estimate instructions for reciprocal and reciprocal square root as an extension of a fused multiply-add floating-point unit (FPU). For such estimate instructions the primary design goals are twofold: The estimate should be of a relatively high precision, so that with one iteration step of a numerical approximation algorithm, such as Newton-Raphson, one can get to full single precision accuracy or at least close to full precision. It should be possible to implement the estimate instructions with little hardware overhead and with little impact on the processor's cycle time and pipeline structure. In particular, the design should not increase the pipeline depth of the FPU for any non-estimate instruction.

There are a number of different ways in which such an estimate instruction might be implemented. One way is to simply look up the estimate in a table. The usefulness of this technique, however, is limited, since the level of precision available is limited by the size of the table. To achieve a desirable level of accuracy, a very large table would be needed (which would be expensive in terms of the hardware needed to store the table).

A conventional implementation for such estimate instructions therefore consists of two steps: First, a table lookup provides a base value and a slope. Then, the base and slope values are used to linearly interpolate an estimate with the desired precision. Since the table lookup is followed by an interpolation step, the results of the table lookup can have a low precision, and therefore the required table is much smaller than would be necessary for a direct table lookup without interpolation.

In this two-step procedure, the interpolation can either be executed using the general-purpose FPU hardware of the processor or by adding specialized hardware for computing the interpolation. When the general-purpose FPU datapaths are used, the estimate instruction turns out to have a longer latency than a basic fused multiply-add instruction. That adds complexity to the processor's control logic, since it means that the latency of the FPU will vary according to the instruction type. Some existing implementations avoid this complexity at the expense of performance by assuming a single FPU latency and stalling the execution for the additional cycles while executing an estimate instruction. Furthermore, the longer latency can cause significant hardware overhead in the instruction issue and dependency check hardware.

As suggested above, the interpolation step does not require a full general-purpose FPU. Instead, it can be executed with a multiplier of reduced size, an adder, and some additional logic. With this specialized hardware, the interpolation step can be processed much more quickly than with a general-purpose FPU, i.e., the latency of the estimate instruction approaches that of a regular multiply-add instruction. The obvious drawback of this solution is the extra hardware required to speed-up the interpolation step.

What is needed, therefore, is a processor design in which floating-point function estimate instructions can be implemented without incurring significant costs in terms of performance and hardware complexity. The present invention provides a solution to these and other problems, and offers other advantages over previous solutions.

SUMMARY OF THE INVENTION

A preferred embodiment of the present invention provides a method, computer program product, and processor design for supporting high-precision floating-point function estimates that are split in two instructions each: a low precision table lookup instruction and a linear interpolation instruction. Estimates of different functions can be implemented using this scheme: A separate table-lookup instruction is provided for each different function, while only a single interpolation instruction is needed, since the single interpolation instruction can perform the interpolation step for any of the functions to be estimated.

The base and slope provided by the table lookup instructions are stored together in the fraction part of the floating-point result, so that the result of the table lookup can, by itself, serve as a low precision estimate result. Thus, the present invention allows a programmer the flexibility to choose high precision or speed, according to the application at hand.

The estimate instructions can be implemented with little hardware overhead. The tables for the table lookup are small since they provide only a low precision base and a slope. Except for requiring some simple packing and unpacking of bits, the interpolation instruction can be executed in a fused multiply-add FPU core with virtually no additional hardware overhead. Thus, a preferred embodiment of the present invention incurs significantly less overhead than would specialized hardware, while still maintaining a uniform FPU latency, which allows for much simpler control logic. Moreover, breaking the estimate operation into two instructions allows one to take advantage of software pipelining to increase overall instruction throughput.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
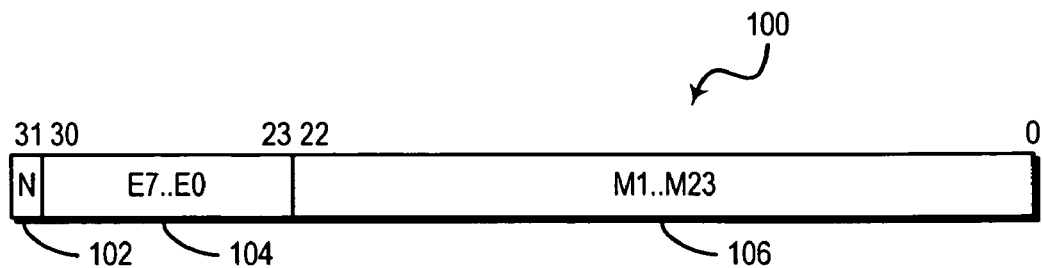
FIG. 1 is a diagram illustrating the IEEE-754 standard floating-point number representation.

A preferred embodiment of the present invention is directed to a processor architecture and instruction set containing efficient instructions for estimating the values of particular floating-point functions. Specifically, a preferred embodiment of the present invention is directed to function estimate instructions for the reciprocal function (1/x) and reciprocal square root function (1/sqrt(x)). FIG. 1 is a diagram illustrating a floating point number 100. Floating point number 100 is represented in IEEE-754 floating-point format, a standard promulgated by the Institute of Electrical and Electronics Engineers (IEEE).

Specifically floating point number 100 is a single-precision floating point number, which according to the standard, comprises 32 bits. These 32 bits are arranged as follows: the most significant bit (MSB) is sign bit 102, which represents the sign of floating point number 100, such that if sign bit 102 is equal to one, then floating point number 100 is negative, and if sign bit 102 is equal to zero, floating point number 100 is positive. Bit field 104, which immediately follows sign bit 102, represents an 8-bit exponent value, while bit field 106, which occupies the maintaining 23 bits of floating point number 100, represents all but the most-significant bit of a 24-bit mantissa. Generally, floating point numbers in IEEE-754 format are expressed in a normalized form, where the most-significant bit is implicitly "1" and is the only bit to the left of the binary point, although this is not strictly necessary. A preferred embodiment of the present invention utilizes normalized numbers, but non-normalized numbers could also be used without departing from the scope and spirit of the present invention. Thus, if bit field 106 contains bits 01010101 . . . , then the 24-bit mantissa represented by bit field 106 is 1.01010101 . . . . Exponent field 104 is biased by adding 127 (to make exponent field 104 an unsigned number), such that the absolute value of floating point number 100 is equal to mantissa 106 times 2 to the power of the difference between exponent field 104 and 127. In this way, floating point number 100 is capable of representing numbers having a negative exponent (i.e., fractions), as well as numbers having a positive exponent (i.e., real numbers in excess of unity).

One of ordinary skill in the art will recognize that embodiments of the present invention may be executed using numeric formats other than the IEEE-754 standard shown here, although a preferred embodiment of the present invention utilizes 32-bit single-precision floating-point numbers in IEEE-754 format. For example, the IEEE-754 standard also supports 64-bit (double-precision) and extended floating point representations (such as an 80-bit format), and there are other non-IEEE-754 floating-point representations as well. Moreover, one of ordinary skill in the art will recognize that the teachings of the present invention are not strictly limited in scope to floating-point numbers, but may also be applied, in whole or in part, to other number types and formats, including (but not limited to) integers and other fixed-point numbers.

Many mathematical functions, including in particular the transcendental functions, are computed in floating-point computer mathematics using numerical approximation techniques, such as the Newton-Raphson method. Many of these approximation techniques, such as the aforementioned Newton-Raphson method, are iterative, meaning that several successive iterations of the approximation method must be completed to achieve an approximation of sufficient accuracy for the application in question. Because of the time-consuming nature of computing these functions iteratively, some processor architectures supporting floating point operations include instructions for obtaining a rapid estimate of the function in question, which can be made more accurate through a small number of iterations of an approximation technique, such as a single iteration of Newton-Raphson. Typically, this is done by combining a table look-up with a linear, polynomial, or other interpolation step. Because of the complex nature of this operation, however, such instructions may require large latency delays, thus hindering their performance and raising the complexity of the underlying hardware.

Figure 2:
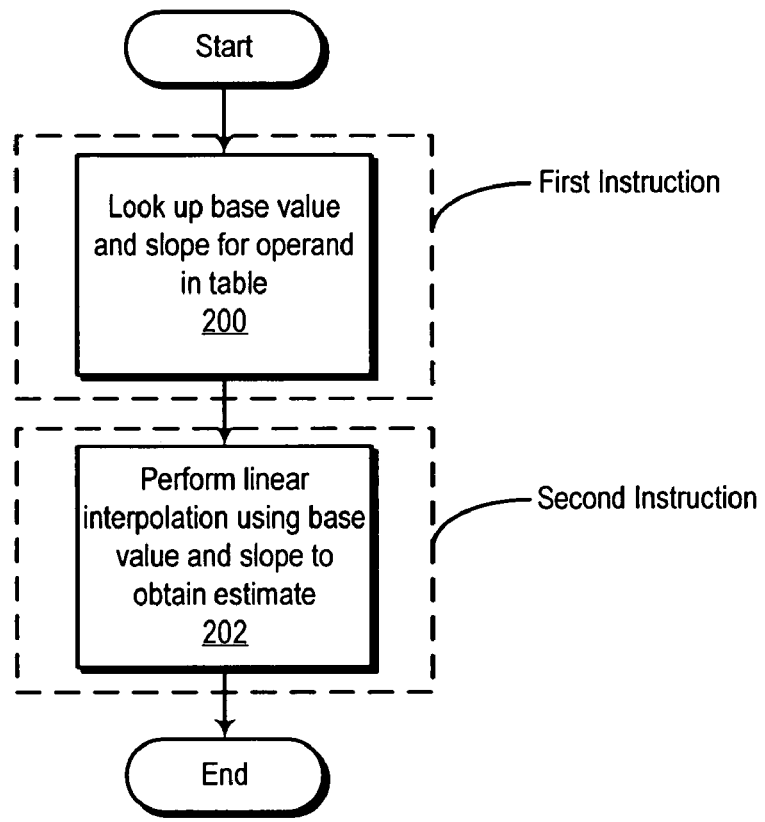
FIG. 2 is a flowchart representation of a process of estimating a floating-point function in accordance with a preferred embodiment of the present invention.

A preferred embodiment of the present invention seeks to reduce this complexity by breaking the estimation process into two instructions, rather than a single instruction. FIG. 2 is a flowchart representation of a process of computing a function estimate in accordance with a preferred embodiment of the present invention.

Figure 3:
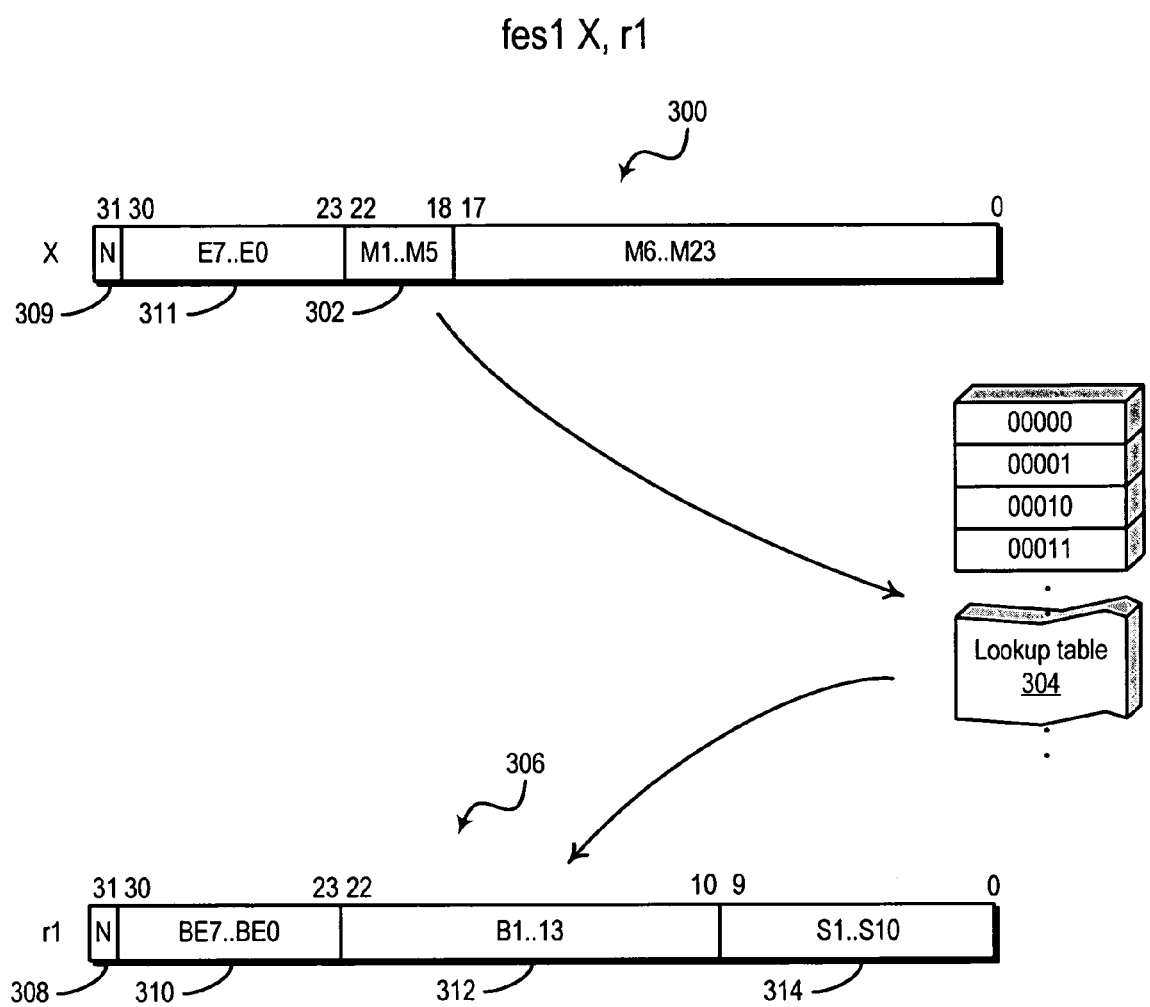
FIG. 3 is a diagram illustrating the operation of a table lookup operation in accordance with a preferred embodiment of the present invention.

As represented by block 200, the estimation process begins with a single instruction in which the instruction's input operand is used to obtain, by table lookup, base value and slope parameters for a subsequent linear interpolation. In a preferred embodiment of the present invention, the instruction returns these parameters in the form of a 32-bit word making up a packed-bit representation of the interpolation parameters. As shown in FIG. 3 and described in the accompanying text, this packed format is arranged such that the 32-bit representation of the interpolation parameters is also a low-precision estimate of the function to be estimated, when interpreted as a single IEEE-754 floating-point number. Thus, an alternative estimation process to that described in FIG. 2 consists of only block 200 and is characterized by greater speed, but lower precision.

Next, as shown by block 202, the processor executes a second instruction on the previously obtained base value and slope, in which the processor uses the base value and slope to perform linear interpolation to obtain an estimate of the desired function evaluated at the value of the original operand. Note that, although a preferred embodiment of the present invention utilizes linear interpolation to complete the estimation process, one of ordinary skill in the art will recognize that other forms of approximation, including other polynomial interpolation schemes, may be used in place of linear interpolation without departing from the scope and spirit of the present invention.

This two-instruction scheme is advantageous in that it requires less hardware to be cascaded in the processor's data path in order to perform estimation. In fact, the look up operation and the interpolation operation can be executed in separate functional units in a processor supporting instructions-level parallelism.

Figure 4:
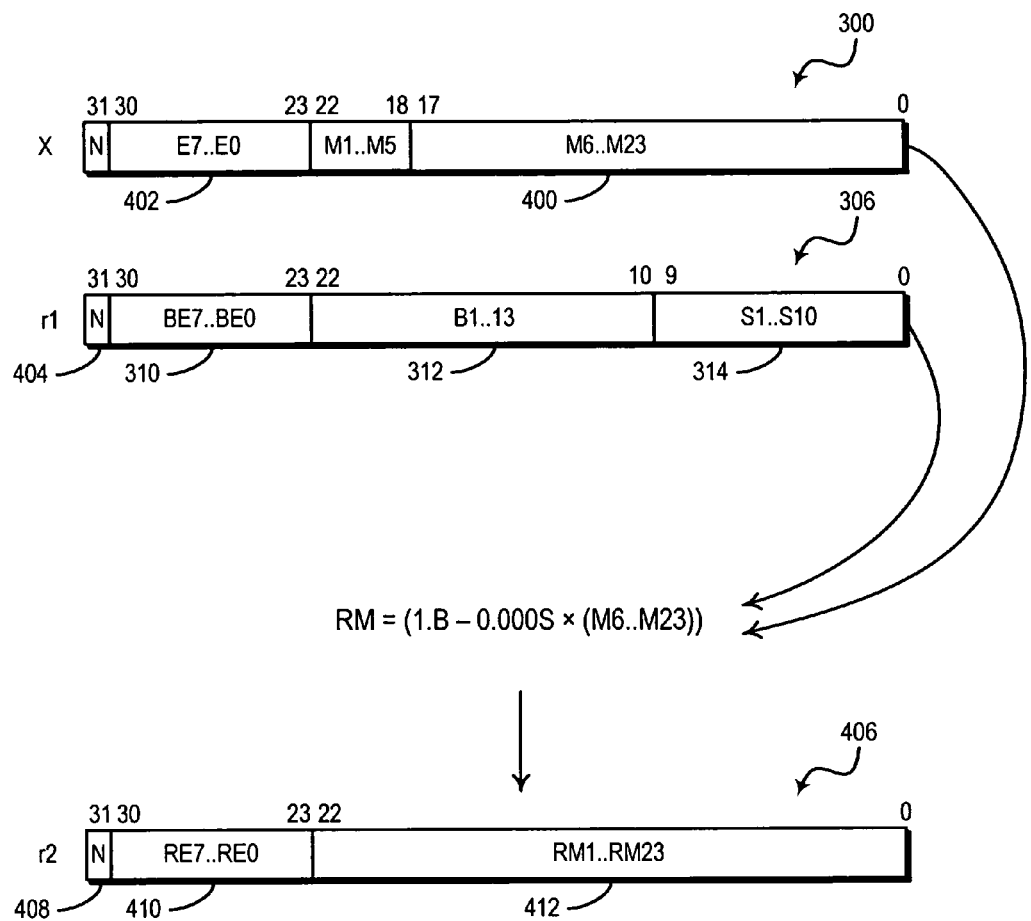
FIG. 4 is a diagram illustrating the operation of an interpolate operation in accordance with a preferred embodiment of the present invention.

FIGS. 3 and 4 are diagrams providing a more detailed illustration of the two instructions described in FIG. 2. FIG. 3 is a diagram representing a process of executing an initial table look up operation, as represented by block 200 in FIG. 2. In this example, we will refer to the instruction as "fes1" (representing a "first function estimate instruction"). The instruction being executed in FIG. 3 is "fes1 X, r1," which means look up base and slope values for operand X and store the base and slope values in register r1. Floating point number 300 represents the operand X, as represented in IEEE-754 standard format. In a preferred embodiment in which a reciprocal estimate is calculated, the five most significant bits of the mantissa of floating point number 300 are used as an index to look up table 304, which contains base and slope values for each of the 32 different combinations of the five most significant bits of an arbitrary mantissa. Other combinations of mantissa and exponent bits may be used as an index without departing from the scope and spirit of the present invention. For example, an index for a reciprocal square-root estimate function would need to include at least one exponent bit (the least significant exponent bit), since the value of the mantissa of a reciprocal square root function is dependent on whether the exponent of the function's argument is even or odd. What is retrieved from look up table 304 is placed by the processor into the destination register (here "r1") as a bit-packed representation 306 of base and slope values for performing interpolation to obtain an estimate of a particular function as evaluated at operand X.

Like floating point number 300, base/slope representation 306 is a 32-bit number, which facilitates the execution of instruction fes1 on a 32 bit processor. Base/slope representation 306 includes sign bit 308, an eight bit exponent value 310, a 13-bit base mantissa value 312, and a 10-bit slope value 314. No exponent value for the slope is needed, since the required degree of precision is achieved (at least for the reciprocal and reciprocal square root functions) by base exponent value 310.

The processor retrieves mantissa value 312 and slope value 314 via table lookup, while the processor computes sign bit 308 and exponent value 310 according to whatever rules govern the particular function to be estimated. In the case of a reciprocal, the processor copies sign bit 308 from sign bit 309 of floating-point operand 300. In the case of a reciprocal square-root, since the reciprocal square-root is only defined for positive X, sign bit 308 will simply be positive. Exponent value 310 is computed by performing simple operations, such as addition and subtraction of offsets and shifts, on exponent value 311 of floating-point operand 300. The processor retrieves this offset value from the table along with mantissa value 312, and slope value 314.

At this point, it should be noted that the arrangement of bit fields in base/slope representation 306 closely follows the IEEE-754 floating-point number format, as depicted in FIG. 1. Because base mantissa value 312 is itself a low-precision estimate of the function being estimated, and because base mantissa value 312 is placed where the most-significant bits of mantissa field 106 in the IEEE-754 representation (as in FIG. 1), base/slope representation 306, in its entirety, is itself a low-precision estimate of the function in question. In cases where a programmer wishes to sacrifice precision for speed of computation, therefore, base/slope representation 306 may be used, as is, as a low-precision estimate of the function in question. Otherwise, base/slope representation 306 may be presented as input to a subsequent interpolation instruction, as depicted in FIG. 4.

As shown in FIG. 4, the interpolation instruction, here "fes2," takes the original operand (floating point number 300) and the base/slope representation 306 as input. In this example, one writes the instruction as "fes2 X, r1, r2," which means compute an interpolation using X as the operand and the contents of register r1 as the base/slope representation, then store the results in register r2. From base mantissa value 312 (recognizing an implicit "1" to the left of the binary point in the case of a normalized number), a product of two numbers is subtracted. The processor obtains the first of the factors in this product by placing slope bits 314 four places to the right of the binary point (e.g., if the slope bits are 1101110101, then the first factor is 0.0001101110101). The second factor in the product is simply made up of the eighteen least significant bits 400 in the mantissa of X (floating point number 300). The result of the subtraction is then multiplied by the sign and exponent of the base/slope representation. The resulting product is then normalized by the processor and placed into the 23 bit mantissa 412, sign bit 408, and 8-bit exponent portion 410 of interpolation result 406.

Figure 5:
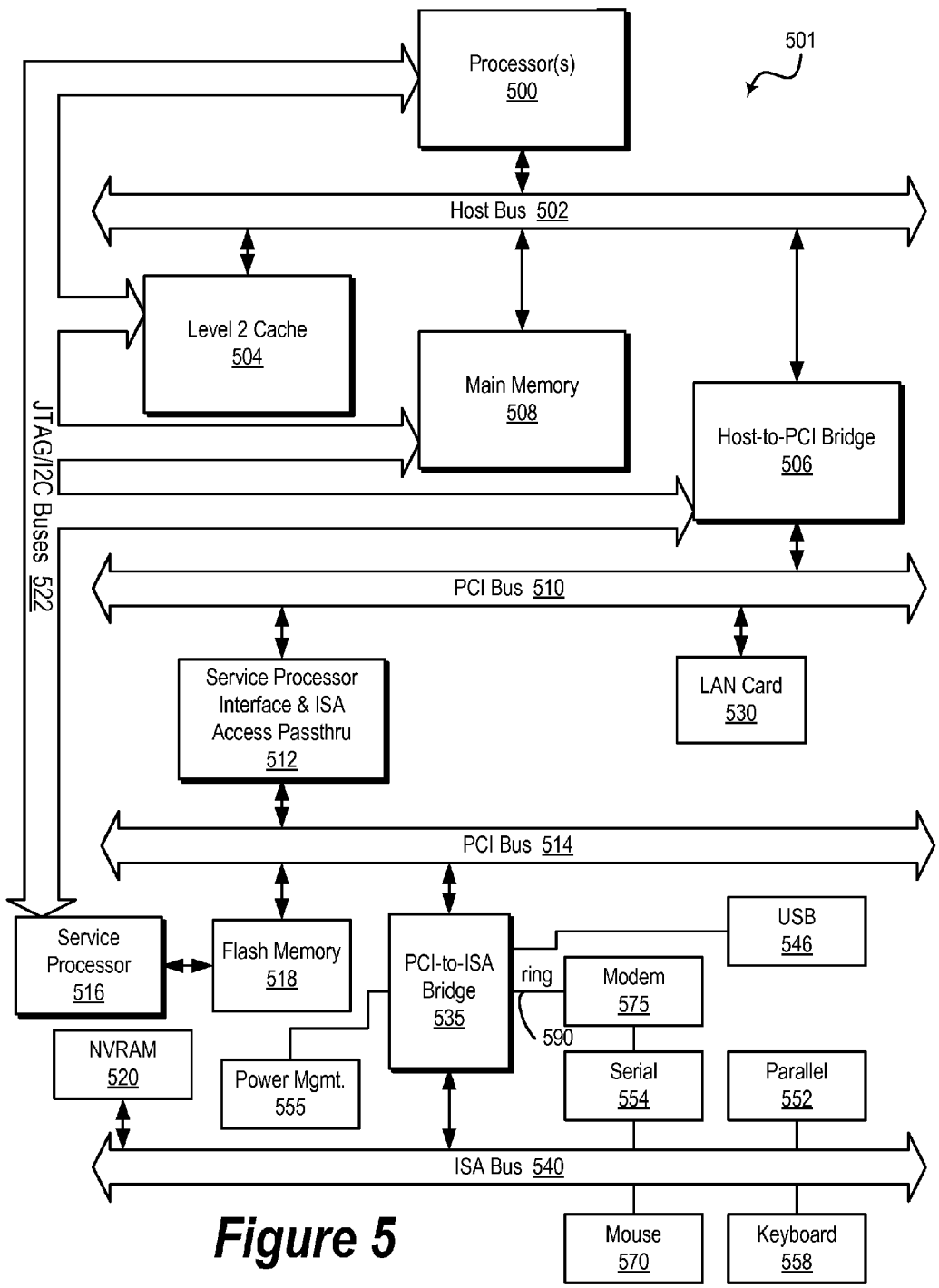
FIG. 5 is a block diagram of an information processing system in which a preferred embodiment of the present invention may be implemented.

FIG. 5 illustrates information handling system 501, which is a simplified example of a computer system capable of performing the computing operations of the host computer described herein with respect to a preferred embodiment of the present invention. Computer system 501 includes processors 500 which are coupled to host bus 502. A level two (L2) cache memory 504 is also coupled to host bus 502. Host-to-PCI bridge 506 is coupled to main memory 508, includes cache memory and main memory control functions, and provides bus control to handle transfers among PCI (Peripheral Component Interconnect bus 510, processors 500, L2 cache 504, main memory 508, and host bus 502. Main memory 508 is coupled to Host-to-PCI bridge 506 as well as host bus 502. Devices used solely by host processor(s) 500, such as LAN (Local Area Network) card 530, are coupled to PCI bus 510. Service Processor Interface and ISA (Industry Standard Architecture) Access Pass-through 512 provides an interface between PCI bus 510 and PCI bus 514. In this manner, PCI bus 514 is insulated from PCI bus 510. Devices, such as flash memory 518, are coupled to PCI bus 514. In one implementation, flash memory 518 includes BIOS (Basic Input/Output System) code that incorporates the necessary processor executable code for a variety of low-level system functions and system boot functions.

PCI bus 514 provides an interface for a variety of devices that are shared by processor(s) 500 and Service Processor 516 including, for example, flash memory 518. PCI-to-ISA bridge 535 provides bus control to handle transfers between PCI bus 514 and ISA bus 540, universal serial bus (USB) functionality 545, power management functionality 555, and can include other functional elements not shown, such as a real-time clock (RTC), DMA (Direct Memory Access) control, interrupt support, and system management bus support. Nonvolatile RAM (Random Access Memory) 520 is attached to ISA (Industry Standard Architecture) Bus 540. Service Processor 516 includes JTAG (Joint Test Action Group) and $I^2C$ (Inter-Integrated Circuit) buses 522 for communication with processor(s) 500 during initialization steps. JTAG/$I^2C$ buses 522 are also coupled to L2 cache 504, Host-to-PCI bridge 506, and main memory 508 providing a communications path between the processor, the Service Processor, the L2 cache, the Host-to-PCI bridge, and the main memory. Service Processor 516 also has access to system power resources for powering down information handling device 501.

Peripheral devices and input/output (I/O) devices can be attached to various interfaces (e.g., parallel interface 562, serial interface 564, keyboard interface 568, and mouse interface 570 coupled to ISA bus 540. Alternatively, many I/O devices can be accommodated by a super I/O controller (not shown) attached to ISA bus 540.

In order to attach computer system 501 to another computer system to copy files over a network, LAN card 530 is coupled to PCI bus 510. Similarly, to connect computer system 501 to an ISP to connect to the Internet using a telephone line connection, modem 575 is connected to serial port 564 and PCI-to-ISA Bridge 535.

While the computer system described in FIG. 5 is capable of supporting the instruction set architecture described herein, this computer system is simply one example of a computer system. Those skilled in the art will appreciate that many other computer system designs are capable of performing the processes described herein.

Particular aspects and possible embodiments of the invention fall within the realm of software. In particular, to utilize the features of a preferred embodiment of the present invention, one must execute software containing estimate instructions in accordance with the teachings of the present invention. An embodiment of the present invention may also include or take the form of microcode, which is software that is internal to the processor and that specifies some of the detailed control steps needed to perform an instruction.

Software, as the term is used herein, is a set of instructions (program code) or other functional descriptive material in a code module that may, for example, be resident in memory (whether random-access memory or read-only memory) of the computer (either internal to a processor or external to it). Until required by the computer, the set of instructions may be stored in another computer memory, for example, in a hard disk drive, or in a removable memory such as an optical disk (for eventual use in a CD-ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A computer-implemented method comprising:
    executing a first instruction on a first portion of a numerical operand to obtain a first instruction result that is a floating point number having a mantissa, a sign bit, and exponent bits, wherein the first instruction corresponds to a function to be estimated, wherein said mantissa contains a first bit field and a second bit field, wherein the first bit field contains the most significant bits of said mantissa and the first bit field represents a base value in a linear interpolation function corresponding to the function to be estimated, and wherein the second bit field contains the least significant bits of said mantissa and the second bit field represents a slope value in the linear interpolation function; and
    executing a second instruction on a second portion of said numerical operand and the first instruction result, wherein the second instruction evaluates said linear interpolation function, as defined by the first instruction result, at said numerical operand to obtain a floating-point estimate of the function to be estimated.

2. The method of claim 1, wherein the first instruction and second instruction are atomic instructions.

3. The method of claim 1, wherein each of the first instruction and second instruction is a single instruction in a native machine language of a processor.

4. The method of claim 1, wherein the function to be estimated is a reciprocal function.

5. The method of claim 1, wherein the function to be estimated is a reciprocal square-root function.

6. The method of claim 1, wherein the second instruction is executed as a fused multiply-add operation.

7. The method of claim 1, wherein evaluating the linear interpolation function includes adding the base value to a product obtained by multiplying the slope value with a subset of bits from said numerical operand.

\* \* \* \* \*